(12) United States Patent
Tomita

(10) Patent No.: US 8,467,029 B2  
(45) Date of Patent: Jun. 18, 2013

(54) LIQUID CRYSTAL DISPLAY ELEMENT

(75) Inventor: Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/238,337

(22) Filed: Sep. 21, 2011

(65) Prior Publication Data

US 2012/0008083 A1      Jan. 12, 2012

Related U.S. Application Data

(60) Division of application No. 11/972,235, filed on Jan. 10, 2008, now Pat. No. 8,049,858, which is a continuation of application No. PCT/JP2005/012792, filed on Jul. 11, 2005.

(51) Int. Cl.  
*G02F 1/1339* (2006.01)

(52) U.S. Cl.  
USPC ................................................ 349/156

(58) Field of Classification Search  
USPC .............................................. 349/155–157  
See application file for complete search history.

(56) References Cited

U.S. PATENT DOCUMENTS

| | | | |
|---|---|---|---|
| 6,115,098 A | 9/2000 | Kume et al. | |
| 6,147,734 A | 11/2000 | Kashima | |
| 6,208,402 B1 | 3/2001 | Tajima | |
| 6,339,462 B1 | 1/2002 | Kishimoto et al. | |
| 6,535,188 B1 * | 3/2003 | Morimoto | 345/87 |
| 6,788,375 B2 | 9/2004 | Ogishima et al. | |
| 7,098,988 B2 | 8/2006 | Chae et al. | |
| 2004/0105053 A1 | 6/2004 | Ozeki et al. | |
| 2004/0160567 A1 | 8/2004 | Kozhukh | |
| 2008/0068553 A1 | 3/2008 | Tomita et al. | |

FOREIGN PATENT DOCUMENTS

| | | |
|---|---|---|
| EP | 1862845 A1 | 12/2007 |
| JP | 58-13515 U | 1/1983 |
| JP | 5188383 A | 7/1993 |
| JP | 876131 A | 3/1996 |
| JP | 11242211 A | 9/1999 |
| JP | 2000-146527 A | 5/2000 |
| JP | 2000-147527 A | 5/2000 |
| JP | 2001-35420 A | 2/2001 |
| JP | 2001-36240 A | 2/2001 |
| JP | 2001-311952 A | 11/2001 |
| JP | 3456896 B2 | 10/2003 |
| JP | 2003-315803 A | 11/2003 |
| TW | 466365 | 12/2001 |
| WO | WO-03-019275 A1 | 3/2003 |
| WO | WO-2006-100713 A1 | 9/2006 |

OTHER PUBLICATIONS

International Search Report of PCT/JP2005/012792, date of mailing Oct. 11, 2005.

(Continued)

*Primary Examiner* — Richard Kim  
*Assistant Examiner* — Michael Inadomi  
(74) *Attorney, Agent, or Firm* — Fujitsu Patent Center

(57) ABSTRACT

A liquid crystal display element of a dot matrix structure comprises a liquid crystal panel constituted by a first substrate equipped with a first electrode, a second substrate equipped with a second electrode, and a liquid crystal layer furnished between the first substrate and the second substrate, wherein the liquid crystal layer comprises a support column of a wall structure possessing adhesiveness, wherein a part of each of the support columns has a wider part.

4 Claims, 18 Drawing Sheets

OTHER PUBLICATIONS

European Search Report dated Oct. 20, 2008 issued in corresponding European Application No. 05765581.3.
Korean Office Action issued Aug. 17, 2009 in corresponding Korean Patent Application No. 10-2008-7000951, with English-language Translation.
USPTO, [Inadomi] "U.S. Appl. No. 11/972,235 (parent)," [CTRS] Requirement for Restriction/Election issued on Apr. 8, 2009.
USPTO, [Inadomi] "U.S. Appl. No. 11/972,235 (parent)," [CTNF] Non-Final Office Action issued on Sep. 1, 2009.
USPTO, [Inadomi] "U.S. Appl. No. 11/972,235 (parent)," [CTFR] Final Rejection issued on Mar. 24, 2010.
USPTO, [Inadomi] "U.S. Appl. No. 11/972,235 (parent)," [NOA] Notice of Allowance and Fees Due issued on Jun. 27, 2011.

* cited by examiner

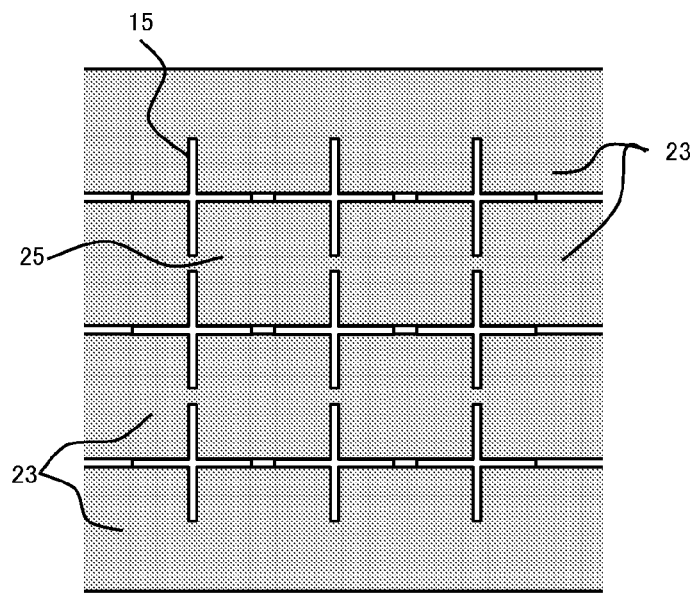
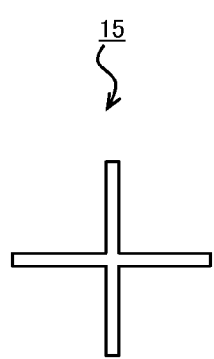
F I G. 4 A          F I G. 4 B
PRIOR ART

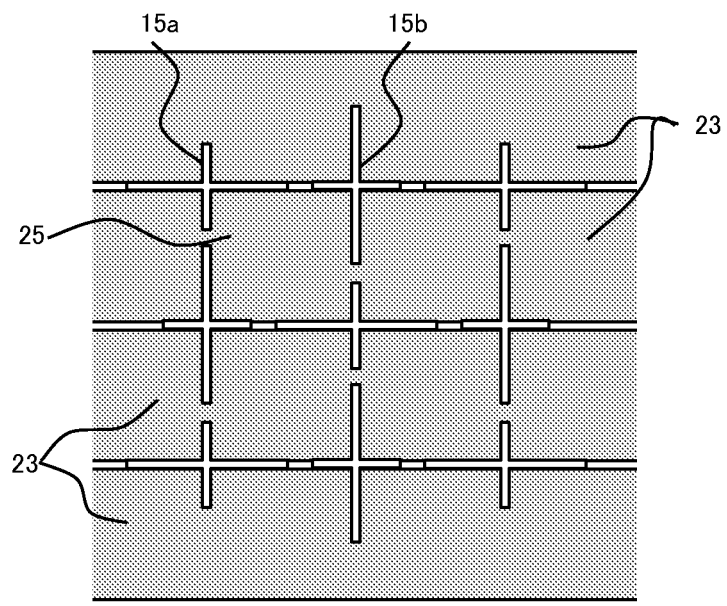
F I G. 5 A
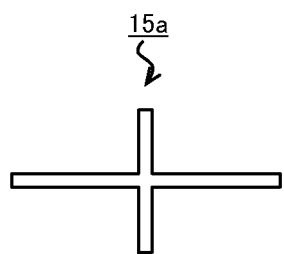
F I G. 5 B

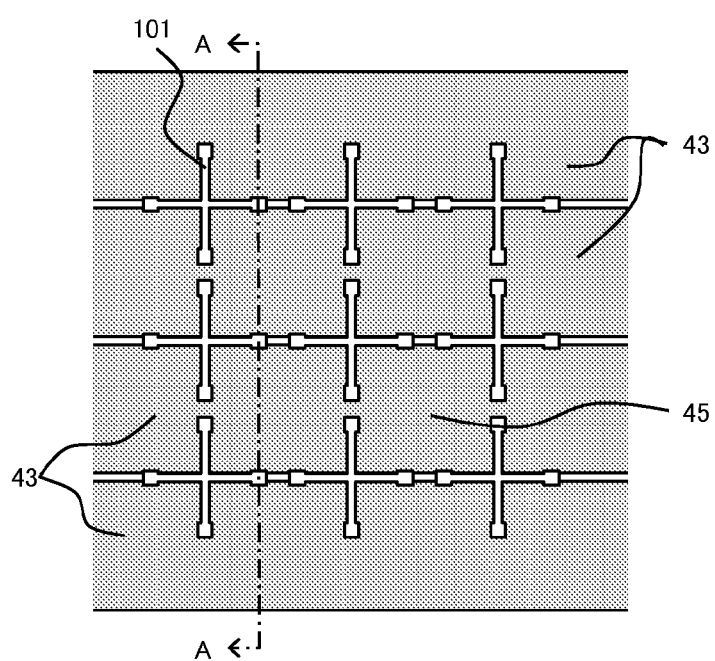 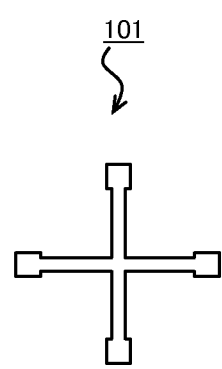
F I G. 7A          F I G. 7B

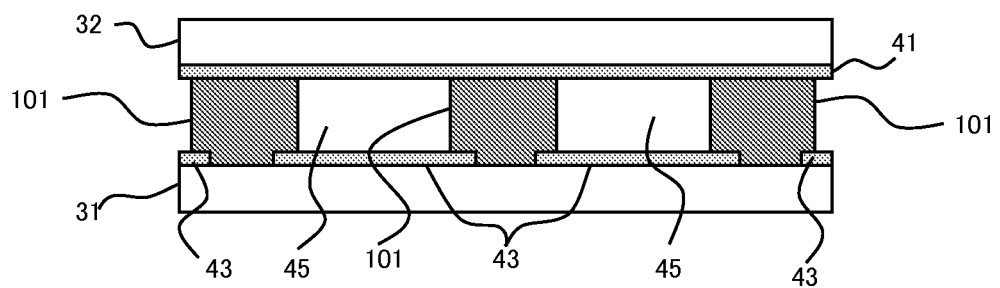
F I G. 9

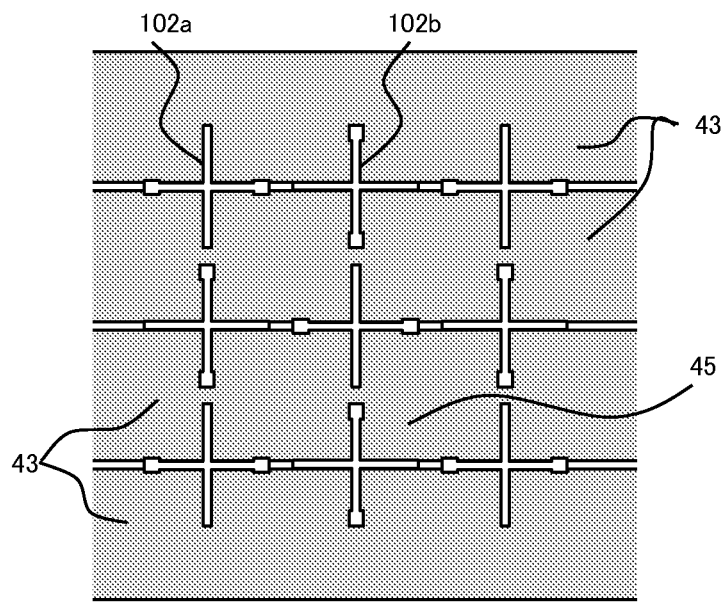
F I G. 1 0 A
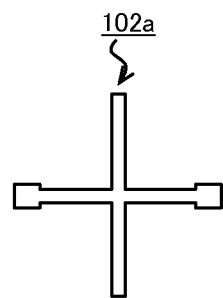
F I G. 1 0 B
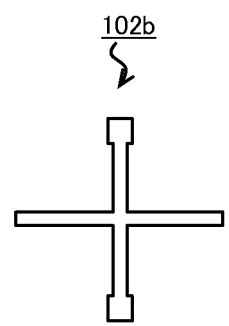
F I G. 1 0 C

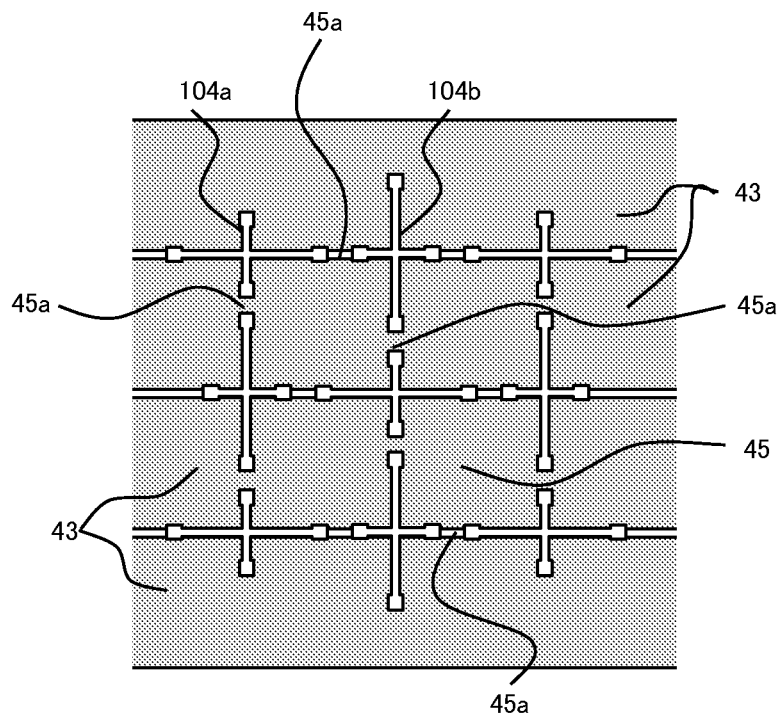
F I G. 1 2 A
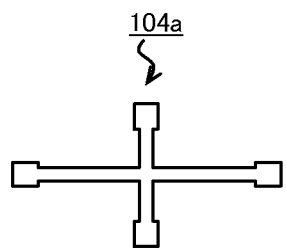
F I G. 1 2 B
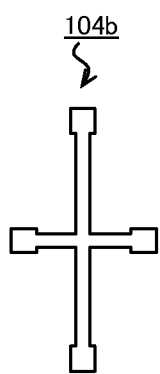
F I G. 1 2 C

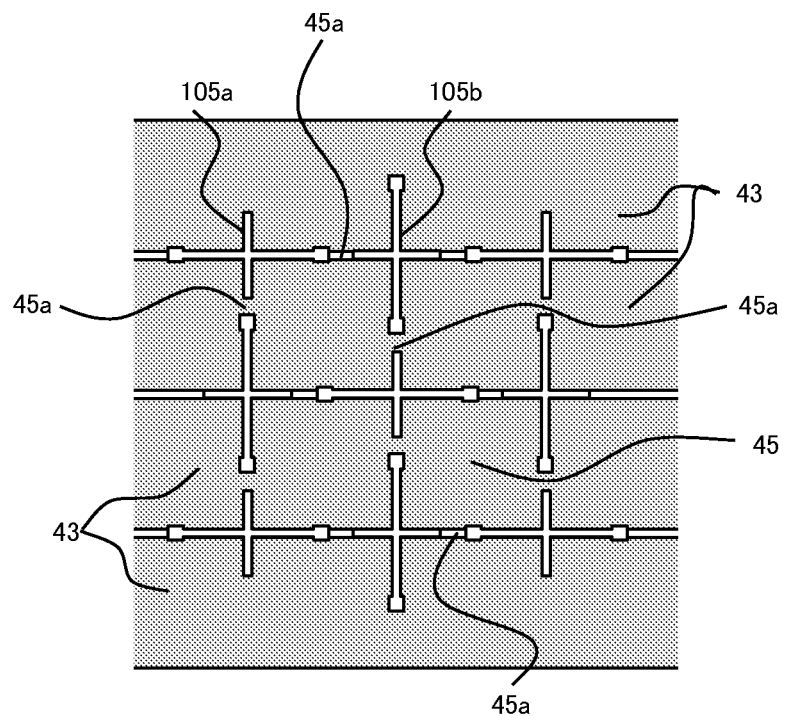
F I G. 1 3 A
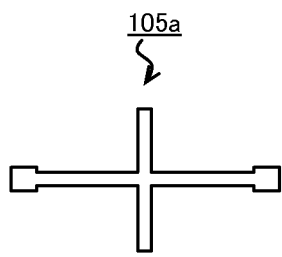
F I G. 1 3 B
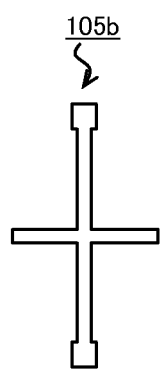
F I G. 1 3 C

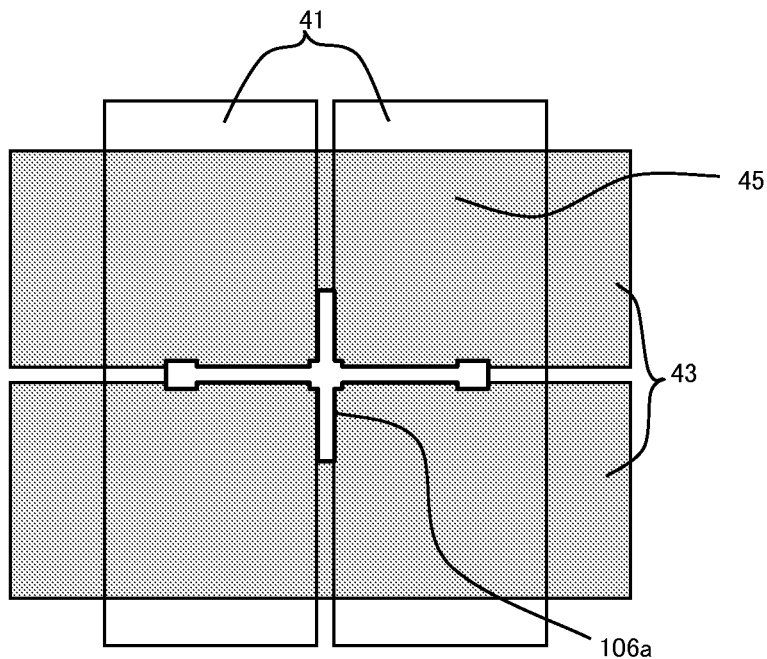
F I G. 1 4 A
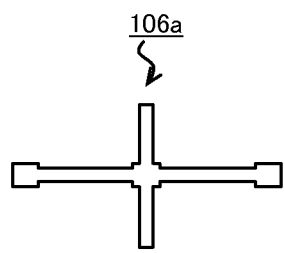
F I G. 1 4 B
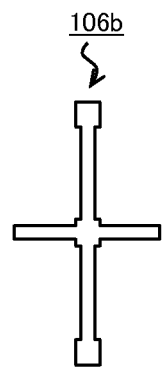
F I G. 1 4 C

LIQUID CRYSTAL DISPLAY ELEMENT

CROSS-REFERENCE TO RELATED APPLICATION

This application is a continuation of PCT application of PCT/JP2005/012792, which was filed on Jul. 11, 2005.

BACKGROUND OF THE INVENTION

1. Field of the Invention

The present invention relates to a liquid crystal display element of a dot matrix system, and in particular to one excelling in flexibility.

2. Description of the Related Art

The rapid popularization of a type of electronic paper capable of retaining a display without a power source and enabling the electronic rewriting of the display content is predicted to happen in the near future. Research is in progress to find a type of electronic paper for accomplishing a reflective display that is gentle to the eyes so as not to tire them and that consumes an extremely low power amount, enabling a memory display to remain even after the power is cut off and enabling it to have a display body that is thin and flexible like paper. Conceivable applications of an electronic paper like this include, for example, electronic books, electronic newspapers, and electronic posters.

Electronic paper is categorized into an electrophoresis method, a twisted ball method, a liquid crystal display, an organic electroluminescence (EL) display, et cetera, depending on the difference of display method.

The electrophoresis method is a method for moving charged particles in the air or liquid. The twisted ball method is a method for rotating charged particles colored in two colors. The organic electroluminescence (EL) display is a self light-emitting display configured to sandwich a plurality of thin films made from an organic material by negative and positive electrodes. The liquid crystal display (LCD) is a non-self luminescent display configured to sandwich liquid crystal layers respectively by pixel electrodes and opposed electrodes.

Research and development of electronic paper made from an LCD is in progress, employing a selectively reflective cholesteric liquid achieving bi-stability by utilizing an interferential reflection of a liquid crystal layer. Here, bi-stability means that a liquid crystal is stable in two different orientation states and a cholesteric liquid crystal is able to retain two stability states, i.e., planer and focal-conic states, for a long time even after the electric field is removed. In the cholesteric liquid crystal, an incident light is reflected in interference during the planer state and the incident light is transmitted during the focal-conic state. Therefore, a contrast of light can be displayed by using the selective reflection of an incident light on the liquid crystal layer in a liquid crystal panel using a cholesteric liquid crystal for the liquid crystal layer, thereby eliminating a necessity of a deflection plate. Note that the cholesteric liquid crystal is also called a chiral nematic liquid crystal.

A cholesteric liquid crystal that reflects a color via the interference of a liquid crystal is overwhelmingly advantageous in a color display of a liquid crystal display and therefore a color display is possible just by layering. Because of this, a liquid display system employing the cholesteric liquid crystal (which is called a "cholesteric liquid crystal system" herein for convenience) is overwhelmingly advantageous as compared to other systems, such as the electrophoresis method, in terms of color display. Other systems require a color filter divisionally colored in three colors for each pixel, causing the brightness to be one third that of the cholesteric liquid crystal. Because of this, the other systems are faced with a big obstacle in the improvement of the brightness for electronic paper.

As described above, while the cholesteric liquid crystal is a strong contender for electronic paper, the biggest problem has been the creation of physical flexibility that is a characteristic of electronic paper.

An LCD element requires a uniform cell with a gap of several micrometers, and a cell is formed by sandwiching a liquid crystal layer several micrometers thick where is between the top and bottom glass substrates. In some common liquid crystal panels of a twisted nematic (TN) type and a super twisted nematic (STN) type, an LCD element using a film substrate (i.e., a plastic liquid crystal) made from a transparent special resin has already been implemented. The plastic liquid crystal can be made thinner and of a lighter weight than a liquid crystal using a glass substrate, and further excels in durability and strength against bending. Therefore, the plastic liquid crystal is freely bendable like a paper and is accordingly suitable for electronic paper.

To accomplish a uniform cell gap in a liquid crystal panel of the TN or STN type, arraying support spacers 5 of a column form in the four corners of a pixel as shown in FIG. 1 has conventionally been proposed.

The liquid crystal panel of the TN type or STN type shown in FIG. 1 has arrayed the support spacers 5 in positions corresponding to grid points of a black matrix 6 on an upper surface substrate 2, wherein a liquid crystal layer is placed between the upper surface substrate 2 and a lower surface substrate 1 that are maintained at an equal distance from each other by the support spacers 5.

The support spacers 5 are featured on the lower surface substrate 1 on which, in addition to the support spacers 5, a seal member 3 for adhering between the upper surface substrate 2 and lower surface substrate 1 is featured. The seal member 3 is an adhesive member formed by printing or such, with the center of one side 3a being featured with an opening part, of which both ends are extended to form an injection hole 4. That is, the configuration is such that a part of the seal member 3 constitutes the injection hole 4 so as to inject a liquid crystal in the area enclosed by the seal member 3.

The top surface of the lower surface substrate 1 and the bottom surface of the upper surface substrate 2 are respectively featured with a plurality of transparent column electrodes (not shown in any drawing herein) and with a plurality of transparent row electrodes (not shown in any drawing herein), perpendicularly crossing the column electrodes. Also, the bottom surface of the upper surface substrate 2 is featured with a black matrix 6. In the LCD element configured, as described above, using a selectively reflective cholesteric liquid crystal in the liquid crystal layer, the part between pixels in which an electrode is not featured in the upper or lower opposed position is continuously lit. Consequently, the black matrix 6 is equipped for improving the contrast of a pixel by preventing it from being continuously lit. As for the method for forming circular or rectangular columns such as the support spacer 5, a forming method using photolithography has been proposed. Further, a liquid crystal display element in which the spacers are in a cross form have proposed.

In the case of a display panel of a selectively reflective cholesteric liquid crystal system, however, the mere accomplishment of a uniform cell gap cannot provide a material with flexibility. The reason for this is that the liquid crystal is a fluid so that the bending of a liquid crystal panel and/or the pressing of the display surface moves the liquid crystal forced by the added force of such action(s), resulting in a change in the display states. In the case of displaying a liquid crystal panel using the TN type or STN type, a change of display states can be reverted back to the original state because it is continuously driven electrically. In the cholesteric liquid crystal possessing a display memory property, however, the display cannot be reverted back to the original until it is re-driven.

An example of a method for featuring support spacers as shown in FIG. 1 for an element panel of the cholesteric liquid crystal is disclosed; a liquid crystal light modulation display element, however, mainly aims at securing uniformity in a cell gap therefore the liquid crystal light modulation display element is not configured to retain a memory property of a display element panel of a cholesteric liquid crystal system when performing operations such as bending a liquid crystal panel and/or pressing the display surface.

In the meantime, while the conventionally known capsule construction of a liquid crystal provides the effect of preventing a change in display states, it is faced with the problem of reduced contrast due to light diffusion noise from the capsule wall and that of increased drive voltage due to the capsule wall, thus resulting in a low possibility of implementing it as a commercial product. Particularly, such a light diffusion noise is a big problem for an LCD panel displaying color having a layered structure of liquid crystal layers for each of the colors red, green and blue (RGB).

With these backgrounds, the biggest problem has been implementing an LCD element having a structure that will not allow a change of display even if the electronic paper is pressed or bent in order to be able to apply a selectively reflective cholesteric liquid crystal to electronic paper.

The present applicant of the present invention has proposed an LCD element of the comprisal shown in FIGS. 2 through 4 as an LCD element of a cholesteric liquid crystal applicable to electronic paper.

FIG. 2 is a diagonal view diagram showing an overall three-dimensional configuration of the LCD element; FIG. 3 is a plain view diagram showing a positional relationship between support columns 15 and a matrix electrode for the LCD element; FIG. 4A is an overall layout pattern of the support columns 15 featured on the lower surface substrate 1; and FIG. 4B is a cross-sectional diagram of the column 15 in the horizontal direction.

The configuration is such that an adhesive support spacer 15 is formed to be a wall face structure body in approximately the form of a cross and gaps (i.e., opening parts) for injecting liquid crystal into the pixels are equipped between adjacent support spacers (i.e., columns) 15 as shown in FIG. 2. Also equipped is a wall face structure body 17 (which is called a wall face seal structure body 17 hereinafter for convenience) on the outer circumference of the surface of the lower surface substrate 1. The support column 15 and wall face seal structure body 17 may be made from the same material, making it possible to form them in the same photolithography process.

In the liquid crystal layer, a portion in which the column electrode (i.e., the signal electrode) 21 and row electrode (i.e., the scan electrode) 23 cross with each other constitutes a pixel 25, with the four corners thereof being equipped with support columns 15, respectively. A seal member 13 is placed on the outside of the seal structure body 17 with a prescribed distance apart therefrom. The necessity of the seal member 13 is arbitrary. While the bottom surface of the upper surface substrate 2 is featured with a black matrix 6, the plurality of support columns 15 is similarly patterned as the black matrix 6 with the layout position in the vertical direction of the pattern almost overlapping with that of the black matrix 6, and therefore it may be eliminated. Further, the support columns 15 are arrayed in the gap parts between the signal electrodes 21 and scan electrodes 23 so as to make the opening ratio of the pixels 25 be the maximum, as shown in FIG. 3.

The present applicant has proposed an LCD element having a configuration in which two kinds of support columns 15a and 15b are placed on the lower surface substrate 1 in the pattern as shown in FIG. 5A by virtue of the aforementioned PCT/JP/2005/4925. The LCD element is configured such that the support column 15a shown in FIG. 5 B and the support column 15b shown in FIG. 5C are placed alternately so as to make adjacent columns between the individual scan electrodes 23 different from each other.

Meanwhile, FIG. 6 is a diagram showing a plain view form of the wall face seal structure member 17 featured on the circumference of the lower surface substrate 1 (i.e., in the inside of the seal member 13) of the LCD element proposed. The wall face seal structure member 17 is of the same material as that of the support column 15 and is therefore formed simultaneously in the same process of forming the support column 15.

A prototype modeling of a cholesteric LCD element of the structure shown in FIGS. 2 through 4, however, has uncovered the problem with the LCD element as described in the following.

A fine and high-resolution display is desired for a display element, requiring a finer and smaller form of the electrode structure and wall face structure body (i.e., support columns 15). An electronic paper not using a light source such as a backlight is a reflective display element, strongly requiring improvement in an opening ratio for increasing the brightness (i.e., luminance) of the display.

In the aforementioned LCD display, a higher resolution was attempted by making the gap between electrodes be 10 to 30 micrometers and by narrowing down the width of the support columns 15 in association with the width of the gap, occurring the problem of the support column 15 coming off in the development process of the photolithography process.

The LCD element of the electronic paper commonly uses a plastic film for the substrate. When this is the case, a plastic surface of the substrate is exposed in the gap part between the electrodes on the substrate. The electrode uses a transparent electrode material such as indium tin oxide (ITO). The wall face structure body placed in the gap part between the electrodes has a low degree of adhesion to the plastic surface. A high-resolution pattern of the wall face structure body where the adhesion area size with the substrate 1 becomes small has a structure allowing easy detachment from the plastic surface. Because of this, it can seem that detachment of the support column 15 has occurred. Furthermore, observation of the phenomenon of the detachment shows that the beginning of the detachment is at the tip part of the branch part of the support column 15 of the cross form.

Meanwhile, the wall face seal structure body 17 as shown in FIG. 6 has conventionally been formed to be a few millimeters thick, in consideration of durability. In order to achieve a high-resolution LCD element, such a pattern must be formed finer and smaller, i.e., at a higher resolution. If the pattern is formed at a higher resolution, however, detachment will occur more remarkably in the development process of a photolithography process for forming the support columns 15. This is attributable to a decreased adhesiveness occurring as the seal structure body 17 of a line form becomes more slender.

The material of the wall face seal structure body 17 exerts the function of making the upper and lower surface substrates adhere with each other as a result of a pressurized heat treatment being applied. A reaction gas is generated in the process that the material becomes adhesive and hardened. Further, it has also been discovered that a large number of air bubbles remain in the adhesion surface between the lower surface substrate 1 and wall face seal structure member 17 due to the gas, causing an adhesion failure, which is a factor of the detachment. Furthermore, the remaining gas flows into the liquid crystal layer of the display part, and thus the remaining gas causes an occurrence of a display failure.

SUMMARY OF THE INVENTION

According to one aspect of the present invention, there is a liquid crystal display element of a dot matrix structure including: a liquid crystal panel constituted by a first substrate equipped with a first electrode, a second substrate equipped with a second electrode, and a liquid crystal layer furnished between the first substrate and the second substrate, wherein the liquid crystal layer comprises a support column of a wall structure possessing adhesiveness, wherein a part of each of the support columns has a wider part.

According to another aspect of the present invention, there is a liquid crystal display element of a dot matrix structure including: a liquid crystal panel comprising a first substrate equipped with a first electrode, a second substrate equipped with a second electrode, and a liquid crystal layer furnished between the first substrate and the second substrate, wherein the liquid crystal layer comprises a support column of a wall structure having a wider part in one part thereof and possessing adhesiveness, and a seal structure body of a wall structure having a liquid crystal injection hole.

BRIEF DESCRIPTION OF THE DRAWINGS

FIG. 4A is a partial enlargement diagram of a support column placement pattern of FIG. 3, and FIG. 4B is a diagram showing the form of the support column.

FIG. 7A is a diagram showing a placement pattern of a support column of an LCD element according to a first preferred embodiment of the present invention, and FIG. 7B is a diagram showing a form of the support column of the LCD element according to the first embodiment.

FIG. 9 is an A-A cross-section diagram of the LCD element of the first embodiment shown in FIG. 7A.

FIG. 10A is a diagram showing a placement pattern of support column formed on a lower surface substrate of an LCD element according to a second preferred embodiment of the present invention, FIG. 10B is a diagram showing a form of a first support column of the LCD element according to the second embodiment, and FIG. 10C is a diagram showing a form of a second support column of the LCD element according to the second embodiment.

FIG. 12A is a diagram showing a placement pattern of a support column formed on a lower surface substrate of an LCD element according to a fourth preferred embodiment of the present invention, FIG. 12B is a diagram showing a form of a first support column of the LCD element according to the fourth embodiment, and FIG. 12C is a diagram showing a form of a second support column of the LCD element according to the fourth embodiment.

FIG. 13A is a diagram showing a placement pattern of a support column formed on a lower surface substrate of an LCD element according to a fifth preferred embodiment of the present invention, FIG. 13B is a diagram showing a form of a first support column of the LCD element according to the fifth embodiment, and FIG. 13C is a diagram showing a form of a second support column of the LCD element according to the fifth embodiment.

FIG. 14A is a diagram showing a placement pattern of a support column formed on a lower surface substrate of an LCD element according to a sixth preferred embodiment of the present invention, FIG. 14B is a diagram showing a form of a first support column of the LCD element according to the sixth embodiment, and FIG. 14C is a diagram showing a form of a second support column of the LCD element according to the sixth embodiment.

DESCRIPTION OF THE PREFERRED EMBODIMENTS

The following is a description of the preferred embodiment of the present invention by referring to the accompanying drawings.

Figure 1:
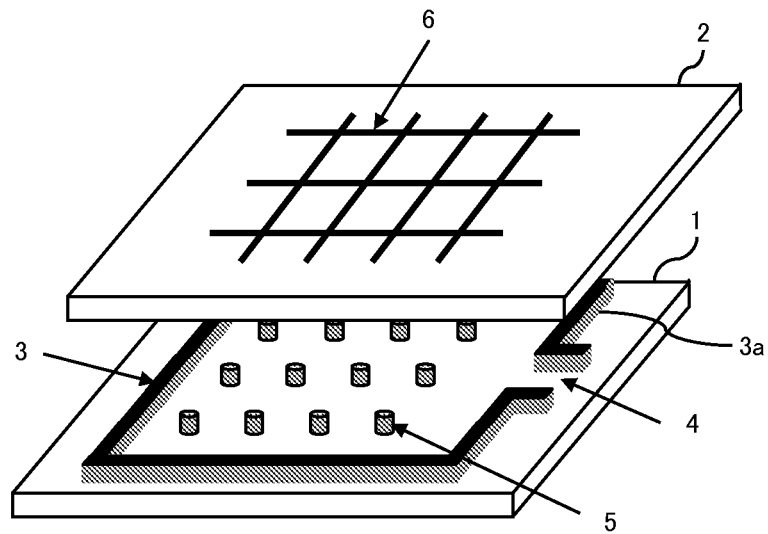
FIG. 1 is a block diagram showing a cell structure of an LCD element of a conventional dot matrix structure accomplishing a uniform cell gap by using support column spacers.
Figure 2:
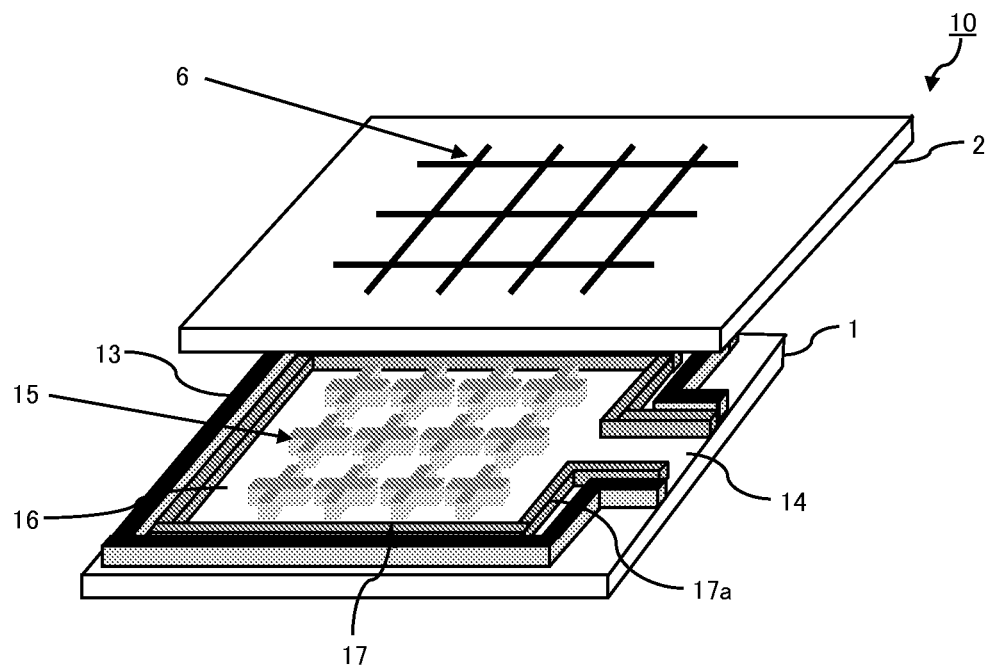
FIG. 2 is a block diagram showing an overall configuration of an LCD element applying a selectively reflective cholesteric liquid crystal to electronic paper.

An LCD element according to the present embodiment is a dot matrix type (i.e., a dot matrix structure), the overall configuration of which is approximately the same as that of the LCD element shown in FIG. 1. The difference between the LCD element according to the present embodiment and the conventional one shown in FIG. 1 is in the form of a wall face structure formed on the lower surface substrate. Also different in some embodiments described later is the configuration of a seal structure body of a wall face structure, in addition to the form of the support column.

In a dot matrix LCD element, a scan electrode is formed in the formation of stripes at equal intervals on a lower surface substrate, and therefore the top surface (i.e., the resin surface) of the lower surface substrate is exposed in the space between scan electrodes. The support columns are formed between the scan electrodes, resulting in the support column contacting with the resin surface. The adhesive force of the resin surface is lower with the support column than with a surface of the scan electrode 43 (i.e., the scan electrode surface), which is a cause for the column detaching in the development process of the photolithography process forming the support column. Therefore, the embodiment described in the following is configured to thicken the tip or center part of the cross-formed branch, and the thickened part is formed so as to contact with a scan electrode surface, thereby making the support column be in close contact with the scan electrode surface. As a result, the configuration suppresses a detachment of the support column in the aforementioned development process.

The following is a description of a preferred embodiment applying the present invention to a dot matrix cholesteric LCD element.

[First Embodiment]

Figure 8:
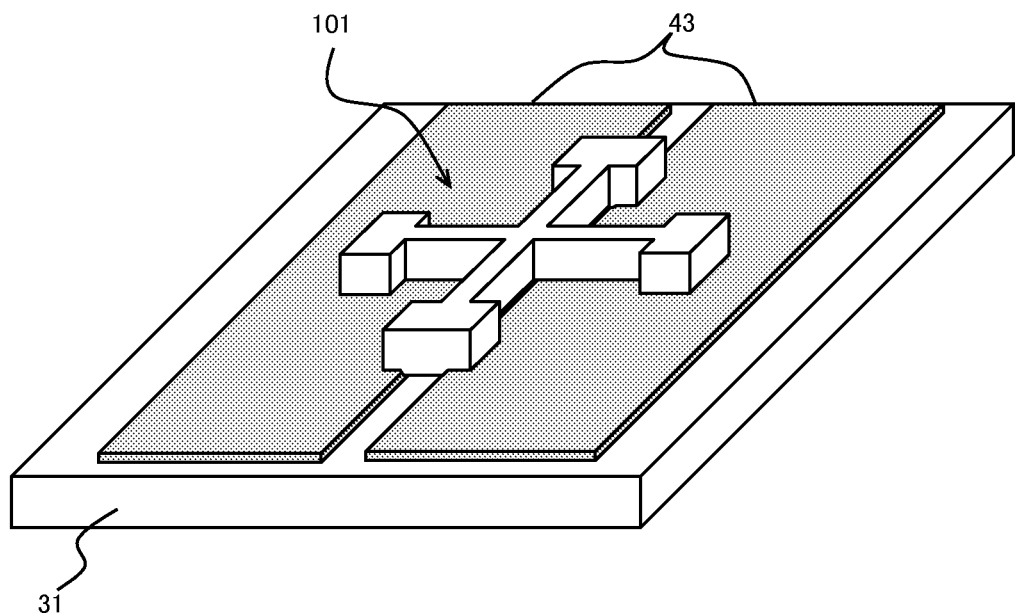
FIG. 8 is a diagram showing a three-dimensional structure of the support column comprised by the LCD element of the first embodiment.

FIGS. 7 through 9 are a diagram showing a configuration of the LCD element according to the first embodiment.

FIG. 7 is a diagram showing the form and placement pattern of a support column formed on the lower surface substrate of the LCD element according to the present embodiment.

A support column 101 of a wall face structure according to the present embodiment is configured to be shaped approximately like a cross, with all four branches thereof thicker at their tips. The support column 101 is made from an adhesive material so as to function as a spacer as well as shown in FIG. 7(*b*).

The support columns 101 are equipped on the four-sided circumference of each pixel 45 arrayed on a scan electrode 43 as shown in FIG. 7 (*b*). Two branches of the support column 101 are formed between the adjacent two scan electrodes 43.

FIG. 8 is a diagram showing a three-dimensional structure of the support column 101 comprised by the LCD element of the present embodiment, showing a support column 101 placed at an edge part of an LCD element.

The support column 101 is a wall face structure body of which the cross section in the horizontal direction is shaped approximately like a cross, as shown in FIG. 8. The surface of a lower surface substrate (i.e., a first substrate) 31 has a plurality of scan electrodes (i.e., first electrodes) 43 at equal intervals, and the two branches of the support column 101 are formed to be in contact with the lower surface substrate 31 between the adjacent two scan electrodes 43. The other two branches of the support column 101 are formed on the scan electrode 43. Since the tip of the support column 101 is thickened, the edge thereof on the scan electrode 43 side is formed on the scan electrode 43. A transparent electrode material such as ITO is used for the electrode.

FIG. 9 is an A-A cross-sectional diagram of FIG. 7. The upper surface of the lower surface substrate 31 has a plurality of scan electrode 43 in equal intervals and also has the support columns 101 possessing adhesiveness between the adjacent scan electrodes 43. A plurality of signal electrodes (i.e., second electrodes) 41 are equipped so that the signal electrodes 41 cross with the scan electrode 43 at right angles when viewed from above on an upper surface substrate (i.e., a second substrate) 32 which is equipped opposite to the lower surface substrate 31 (i.e., at the side of the lower surface substrate 31). The lower surface substrate 31 and upper surface substrate 32 are both adhesively fixed onto the adhesive support columns 101 which, as spacers, maintain a prescribed distance between both of the substrates. The region enclosed by the signal electrode 41, scan electrode 43 and support column 101 is injected with a liquid crystal, thus constituting a pixel 45.

The support column 101 is formed between the scan electrodes 43 where a surface of the lower surface substrate 31 is exposed. As described above, the support column 101 that is an adhesive material has a higher adhesion force to the surface of the scan electrode 43 (noted as "scan electrode surface" hereinafter) than to the surface of the lower surface substrate 31.

Figure 3:
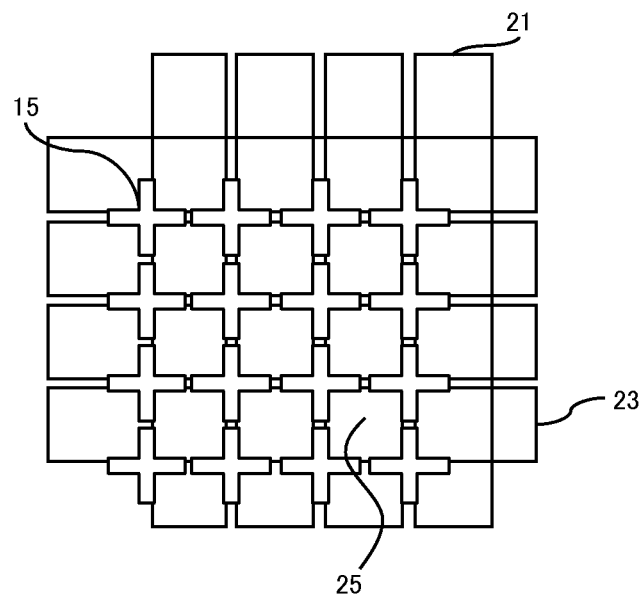
FIG. 3 is a plain view diagram showing a placement pattern of support columns equipped on a lower surface substrate of the LCD element shown in FIG. 2.
Figure 5:
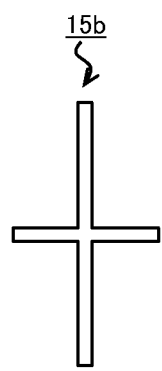
FIG. 5A is a diagram exemplifying a configuration of a placement pattern of support columns in an LCD element applied to electronic paper.
FIG. 5B is a diagram showing a first support column formed on a substrate of the LCD element.
FIG. 5C is a diagram showing a second support column formed on the substrate of the LCD element.
Figure 6:
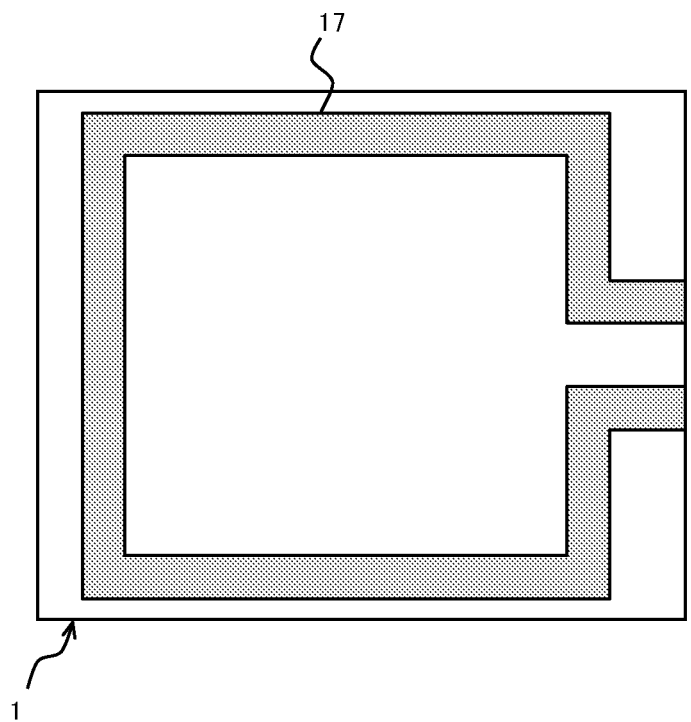
FIG. 6 is a diagram showing a form of a seal structure body formed on a substrate of the LCD element shown in FIG. 2.

The four branches of the support column 101 according to the present embodiment are entirely or partly adhered to the scan electrode surface and therefore the adhesion area size between themselves and the scan electrode surface is larger than the adhesion region between the support column 15 and the scan electrode surface, which is shown in FIG. 3, of which the two branches have no adhesion with the scan electrode surface. By virtue of this, the support column 101 has a higher adhesion force to the scan electrode than the support column 15 does to the scan electrode. Also, an electrode material (e.g., ITO, et cetera) has a higher adhesion force to the support column than a plastic film that is a substrate material does, and therefore the effect of preventing a detachment can be further improved in this aspect. As a result, it is possible to suppress a situation in which the support column 101 is detached from the lower surface substrate 31 in the development process of a photolithography process.

Meanwhile, the support column 101 overlaps with the electrode surfaces (i.e., the signal electrode 41 and scan electrode 43) only on the sides of the branch and therefore the opening ratio of the pixel 45 of the LCD element according to the present embodiment is a little lower than that of the pixel 25 of the LCD element shown in FIG. 3.

Incidentally, the support column 101 according to the present embodiment is configured to be thicker at the tip part of the branches; the place where the area size of the branch is larger (when viewed from above the column), however, can be arbitrarily determined to be anywhere between the center and edge part of the column. To prevent detachment, however, a thickened tip part is most effective. Also, the thickened part is shown as a rectangular shape in the drawing, which is arbitrary; a round shape may be used instead.

In the meantime, the spacer for the liquid crystal layer may use the support column 101 together with a conventional spherical spacer or columnar spacer. Parallel use with such a spacer can be commonly applied to LCD elements according to all embodiments described below.

[Second Embodiment]

FIG. 10 is a diagram showing a configuration of a support column of an LCD element according to a second preferred embodiment. The present embodiment is configured to be capable of better improving the opening ratio of a pixel than the support column 101 of the LCD element according to the first embodiment described above is capable of doing.

The present embodiment is configured to place, as a support column, two support columns 102*a* and 102*b* with wall face structures shown in FIGS. 10 (*b*) and (*c*) as shown in FIG. 10 (*a*). The support column 102*a* is configured to make thicker the tip part of the branch that is parallel with the longitudinal direction of the scan electrode 43. The support column 102*b* is configured to make thicker the tip part of the branch that is perpendicular to the longitudinal direction of the scan electrode 43.

The present embodiment is configured to place these two support columns 102*a* and 102*b* alternately as shown in FIG.

10 (*a*). In this event, the support columns 102*a* and 102*b* are alternately placed in the up/down direction (i.e., the longitudinal direction of the signal electrode) as well as the left/right direction (i.e., the longitudinal direction of the scan electrode 43).

Such a placement makes it possible to maintain the form of the pixel 45 nearly square in the case of rotating the support column 102*a* and support columns 102*b* ninety degrees each.

If a pixel is rectangular, the display of a straight line has different line widths in the vertical and horizontal directions. Therefore, it is preferable that the pixel shape be closer to a square. Because of this, the present embodiment excels in the displaying of straight lines.

The present embodiment is configured such that the adhesion areas of the support columns 102*a* and 102*b*, including the scan electrode surface, are smaller than that of the support column 101 of the first embodiment, and therefore the adhesion force to the scan electrode 43 is smaller than that of the support column 101. However, the opening ratio of the pixel 45 is larger in the present embodiment. The opening ratio of the pixel 45 is only slightly lower than that of the pixel 25 shown in FIG. 3.

[Third Embodiment]

Figure 11A:
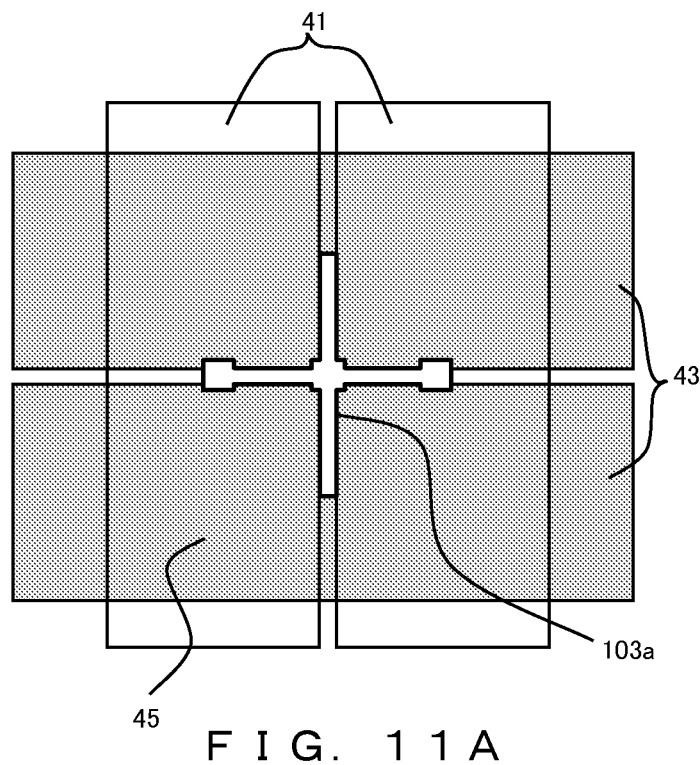
FIG. 11A is a diagram showing a placement pattern of a support column formed on a lower surface substrate of an LCD element according to a third preferred embodiment of the present invention.
Figure 11B:
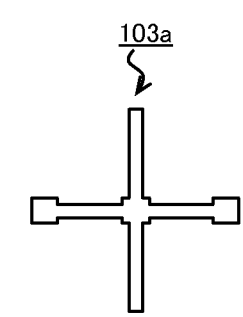
FIG. 11B is a diagram showing a form of a first support column of the LCD element according to the third embodiment.
Figure 11C:
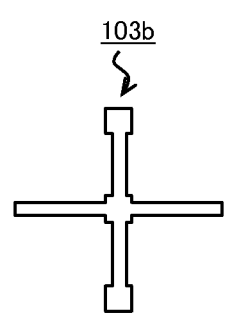
FIG. 11C is a diagram showing a form of a second support column of the LCD element according to the third embodiment.

FIG. 11 is a diagram showing a configuration of a support column of an LCD element according to a third preferred embodiment.

The present embodiment is configured to form, as a support column, two support columns 103*a* and 103*b* of wall face structures shown in FIGS. 11 (*b*) and (*c*) on the lower surface substrate, thereby improving the adhesion force to electrode surfaces (i.e., a scan electrode surface and a signal electrode surface) over that of the second embodiment.

The support column 103*a* is configured to have a center part thicker than that of the support column 102*a*. The support column 103*b* is configured to have a center part thicker than that of the support column 102*b*. The support column 103*b* makes contact with a resin surface having a lower adhesion force to both the lower surface substrate and the upper surface substrate because it is placed in a gap part between the signal electrode 41 and scan electrode 43, as shown in FIG. 11(*a*).

The support columns 103*a* and 103*b* are configured to have a center part thicker than that of the support columns 102*a* and 102*b* of the second embodiment, thereby further suppressing the detachment of the support column in the development process of a photolithography process as compared to that of the second embodiment.

Meanwhile, an adhesion force of the upper surface substrate to the support columns 103*a* and 103*b* is generated by a pressurized heating process in the adhesive attachment process, the support columns 103*a* and 103*b* have a lower adhesion force to the resin surface (i.e., the exposed surface of the upper surface substrate). The support columns 103*a* and 103*b* according to the present embodiment are configured to adhere to the signal electrode 41 formed on the upper surface substrate at the center of the support columns 103*a* and 103*b*, thereby improving the overall adhesion force to the upper surface substrate.

[Fourth Embodiment]

FIG. 12 is a diagram showing a configuration of an LCD element according to a fourth preferred embodiment.

As shown in FIGS. 12 (*b*) and (*c*), two support columns 104*a* and 104*b* according to the present embodiment are configured to modify the form of the support column 101 of the first embodiment. The support column 104*a* is formed to shorten the branch of the support column 101 in the vertical direction. The support column 104*b* is formed to shorten the branch of the support column 101 in the horizontal direction. The placement pattern of the columns 104*a* and 104*b* are similar to that of the support column 101 of the first embodiment (refer to FIG. 7 (*a*)).

The present embodiment is configured to improve the adhesion force of the support columns 104*a* and 104*b* to (the scan electrode surface of) the lower surface substrate in a similar method to the case of the second embodiment, thereby suppressing the detachment of the support columns 104*a* and 104*b* in the development process of a photolithography process.

The present embodiment is also configured to place the opening parts 45*a* of the pixels 45 in a zigzag formation so as to suppress the flow-out of the liquid crystal from the inside of the pixel 45 when a pressure is applied thereto.

[Fifth Embodiment]

FIG. 13 is a diagram showing a configuration of an LCD element according to a fifth preferred embodiment.

As shown in FIGS. 13 (*b*) and (*c*), two support columns 105*a* and 105*b* of the LCD element according to the present embodiment are configured to modify the support columns 102*a* and 102*b*, respectively, of the second embodiment. The support column 105*a* is configured to shorten the branch of the support column 102*a* in the vertical direction. The support column 105*b* is configured to shorten the branch of the support column 102*b* in the horizontal direction. The placement pattern of the support columns 105*a* and 105*b* is similar to that of the support columns 102*a* and 102*b*.

The results of an experiment show that it is most effective to have the tip parts of the longer branches be wider when there are different branch lengths in the cross form. The present embodiment is an application of the result of the experiment.

The present embodiment is configured to place the opening parts 45*a* of the pixels 45 in a zigzag formation, thereby obtaining a similar effect to that of the fourth embodiment described above.

[Sixth Embodiment]

FIG. 14 is a diagram showing a configuration of an LCD element according to a sixth preferred embodiment.

As shown in FIGS. 14 (*b*) and (*c*), two support columns 106*a* and 106*b* of the LCD element according to the present embodiment are configured to widen the center parts of the support columns 105*a* and 105*b*, respectively, of the fifth embodiment, thereby enabling a similar effect to the LCD element of the fifth embodiment. The placement pattern of the support columns 106*a* and 106*b* is similar to the case of the LCD element of the fifth embodiment as shown in FIG. 13 (*a*).

Meanwhile, the center part of the support column 106*a* is adhered to the scan electrode 43 featured on the lower surface substrate and a surface of the signal electrode 41 featured on the upper surface substrate as shown in FIG. 14 (*a*). Being not specifically shown in a drawing herein, the center part of the support column 106*b* is also adhered to the scan electrode 43 featured on the lower surface substrate and to a surface of the signal electrode 41 featured on the upper surface substrate. As a result of this, the effect of increasing an adhesion force between the lower surface substrate and upper surface substrate is also obtained.

In the aforementioned respective embodiments, the width between electrodes (i.e., between the scan electrode and signal electrode) and the width of the tip part are set to be 10 micrometers and 30 micrometers, respectively, as an example. The margin for the positional shift of a photolithography process for forming the support column that is a wall face structure is about plus or minus 5 micrometers, and therefore the adhesion force is maintained since the tip part is in contact with the electrode surface by way of the air gap between the electrodes even if the positional shift occurs, provided that the width of the tip part is about 30 micrometers.

[Seventh Embodiment]

Figure 15:
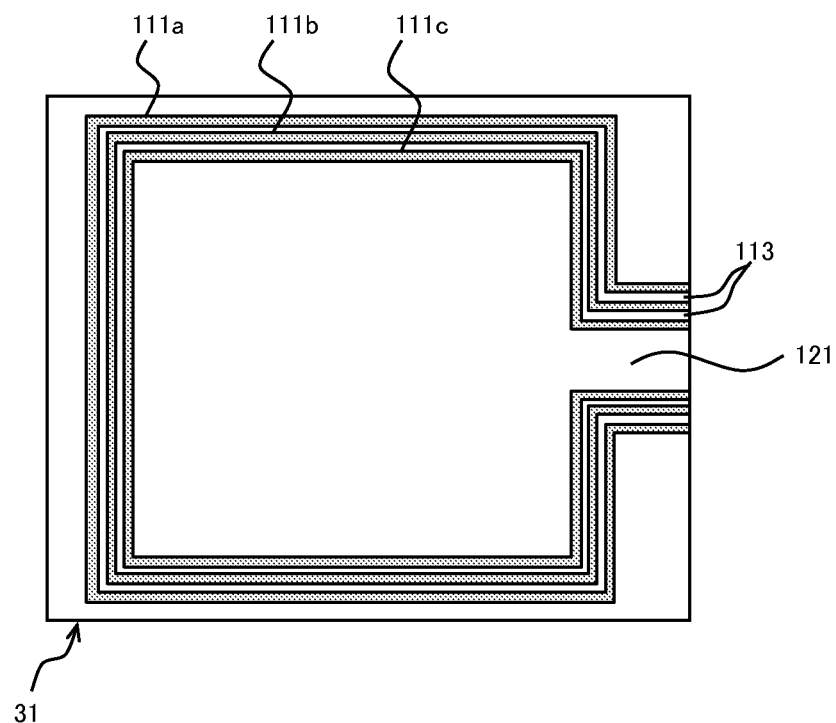
FIG. 15 is a diagram showing a seal structure body formed on a lower surface substrate of an LCD element according to a seventh preferred embodiment of the present invention.

FIG. 15 is a diagram describing a configuration of an LCD element according to a seventh preferred embodiment.

As shown in FIG. 15, the LCD element according to the present embodiment is configured to make a seal structure body formed on the lower surface substrate a triplex structure be constituted by seal structure bodies 111a, 111b and 111c, in place of a single seal structure body.

Incidentally, the present embodiment is configured to make the seal structure bodies consist of three lines; the seal structure body according to the present invention, however, may consist of a plurality of lines of no less than two lines, in lieu of being limited to three lines. This is the same for all other embodiments to be described in the following descriptions.

The widths (i.e., the horizontal widths) of the individual seal structure bodies 111a, 111b and 111c are the same, for example. The widths are smaller than the conventional seal structure body 3 shown in FIG. 1, at around 0.001 to 1 mm, for example.

As such, the configuration of a triplex structure constituted by three lines makes it possible to prevent the phenomenon of the gas that is generated during the adhesive hardening process in the process for making the upper and lower surface substrates adhere with each other remaining in the adhesion surface of the substrate and seal structure body. The reason is that the gap 113 between the seal structure bodies is connected to the vicinity of a liquid crystal injection hole 121 so that the reaction gas of the seal structure body adhesively hardening is effectively exhausted from the vicinity of the liquid crystal injection hole, while maintaining the strength of the seal structure body.

Moreover, the seal structure body is constituted by a plurality of lines and therefore, even if some of the lines are cut, the other lines maintain the seal function, thereby improving the reliability of the LCD element. If the seal is cut in the process of injecting the liquid crystal, a seal leakage phenomenon occurs, causing a failure consisting of inability to inject the liquid crystal. The present embodiment is enabled to prevent an occurrence of the seal leakage phenomenon.

[Eighth Embodiment]

Figure 16:
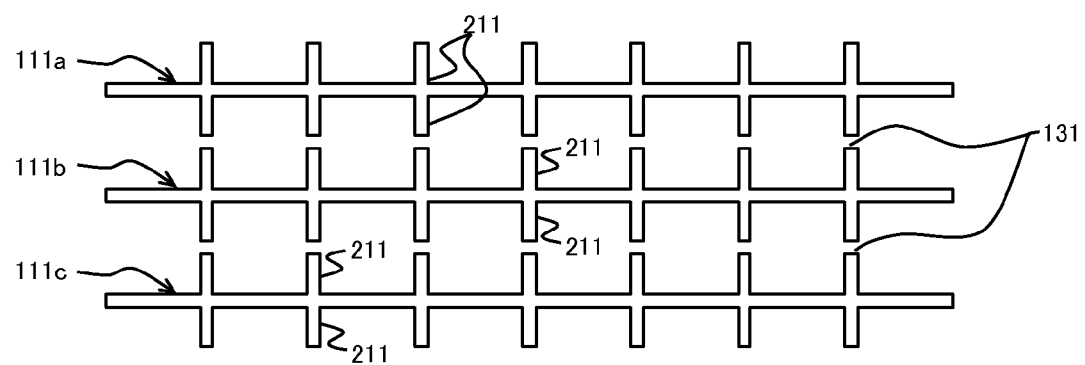
FIG. 16 is a partial enlargement diagram of a seal structure body of an LCD element according to an eighth preferred embodiment of the present invention.

FIG. 16 is a partial enlargement diagram of a seal structure body describing a characteristic of an LCD element according to an eighth preferred embodiment.

A prototype modeling of an LCD element of the seventh embodiment having a seal structure body of fine lines has resulted in the discovery that there is a high probability that the seal structure body will fall over in the development process of a photolithography process for forming the seal structure body, thus resulting in a detachment thereof.

An LCD element according to the eighth embodiment eliminates the problem of the LCD element of the seventh embodiment, and is configured to improve the adhesion force of the seal structure body to the lower surface substrate, thereby preventing detachment of the seal structure body in the photolithography process.

The present embodiment is configured to equip the seal structure bodies 111a, 111b and 111c of the seventh embodiment with a plurality of branches 211 on both sides of the lines as shown in FIG. 16, in place of simple lines. The configuration of the seal structure bodies 111a, 111b and 111c having such a line form makes the branches 211 contact with the lower surface substrate, thus improving the contact area size of the seal structure bodies 111a, 111b and 111c with the lower surface substrate. This configuration makes the seal structure bodies 111a, 111b and 111c stable, i.e., they will not fall over easily. This prevents detachment of the seal structure bodies 111a, 111b and 111c in the development process of a photolithography process even if their width is configured to be small, thereby improving yield in production.

It is further configured to provide gaps 131 in between the respective seal structure bodies, with the gaps 131 being connected to the vicinity of the liquid crystal injection hole. This configuration results in exhausting the reactive gas being generated in the gap parts between the respective seal structure bodies from the vicinity of the liquid crystal injection hole through the gaps 131.

[Ninth Embodiment]

Figure 17:
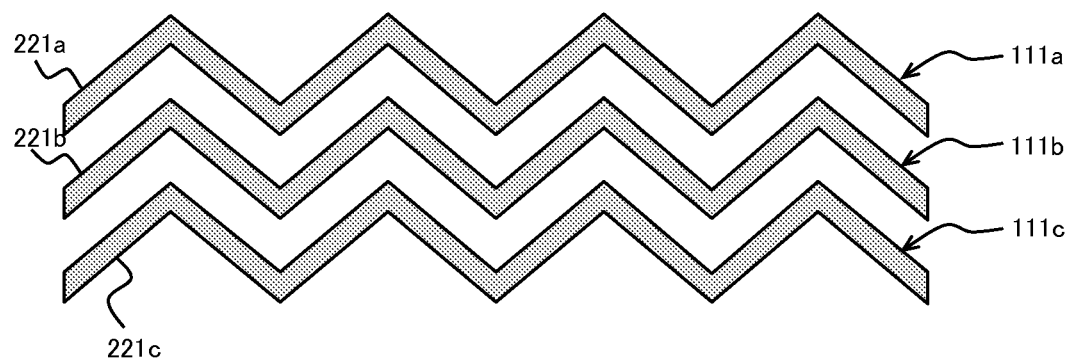
FIG. 17 is a partial enlargement diagram of a seal structure body of an LCD element according to a ninth preferred embodiment of the present invention.

FIG. 17 is a partial enlargement diagram of a seal structure body showing a characteristic of an LCD element according to a ninth preferred embodiment.

The present embodiment is configured to form the seal structure bodies 111a, 111b and 111c in the lines of the repetition of crooked patterns in the manner of "triangular waves" as shown in FIG. 17, thereby making the seal structure bodies 111a, 111b and 111c not fall over easily.

The respective "triangular waves" parts 221a, 221b and 221c of the seal structure bodies 111a, 111b and 111c are in approximately the same form and size, nesting each other.

[Tenth Embodiment]

Figure 18:
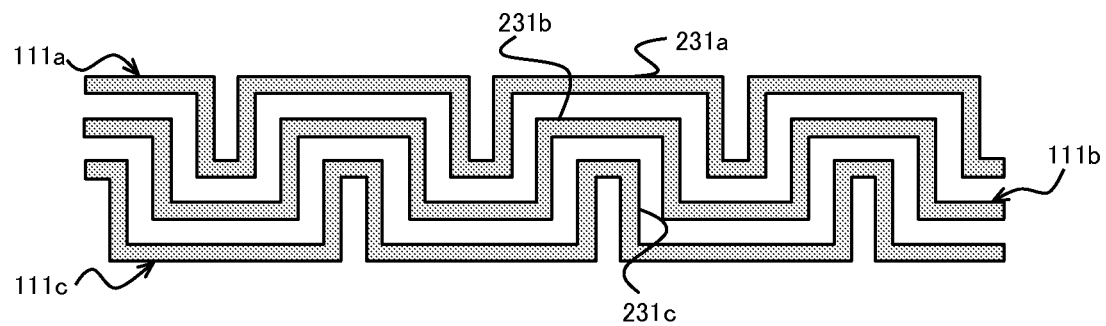
FIG. 18 is a partial enlargement diagram of a seal structure body of an LCD element according to a tenth preferred embodiment of the present invention.

FIG. 18 is a partial enlargement diagram of a seal structure body describing a characteristic of an LCD element according to the tenth embodiment.

The LCD element according to the tenth embodiment is configured to form the seal structure bodies 111a, 111b and 111c to have convex formed crooked parts 231 as shown in FIG. 18. The sizes of the convex crooked parts 231 are, in order of size, convex crooked part 231a of seal structure body 111a, convex crooked part 231b of seal structure body 111b and convex crooked part 231c of seal structure body 111c.

The convex crooked part 231c of seal structure body 111c is nested in the convex crooked part 231b of seal structure body 111b, and the convex crooked part 231b of seal structure body 111b is nested in the convex crooked part 231c of seal structure body 111a.

The maximum distance between the seal structure body 111a and seal structure body 111c is the same as that between seal structure body 111a and seal structure body 111c of the eighth embodiment, shown in FIG. 15 as an example. The configuration of the eighth through tenth embodiments makes it difficult for the seal structure body to fall over and also improves the strength.

As described above, the aforementioned embodiments are configured to make the width of a center part or a tip part thicker than the other parts so that the support column adheres with the electrode surface, thereby improving the adhesion force of the support column to the lower surface substrate. This configuration makes it possible to suppress the occurrence of detachment of the support column in the development process of the photolithography process, forming the pattern of a plurality of support columns even if the horizontal width of the support column that is a wall face structure body is made smaller. Also, the area size of only the tip part or center part is larger than the other parts and therefore a decrease in the opening ratio of the pixel can be limited to a minimum. Incidentally, all of the above embodiments are configured to equip all of the four sides of a pixel with an opening part; the opening of the pixel, however, requires only at least two sides for pixels other than the one located at the edge of the display area. The pixel at the edge (e.g., the pixels at the four corners of the display area) may sometimes require only one opening part. Therefore, a configuration maybe such that the pixels not positioned at the edge of the display area are equipped with opening parts on at least two sides, and such that the tip parts of the adjacent support columns are connected too close for a pixel that does not necessarily require an opening part.

Further, the form of a pixel in the above embodiments is not necessarily a rectangle.

[Production Method]

Next is an example of a production method for the LCD element of the aforementioned embodiments of the present invention:

(1) Forming a pattern of a scan electrode in a stripe form on the lower surface substrate.

(2) Forming a film of a wall face material of a few micrometers by coating the lower surface substrate, which has a pattern of the scan electrode, with the wall face material that is a photoreceptor.

(3) Exposing the wall face material in an ultraviolet exposure process byway of a photo mask for forming the support columns and seal structure body, followed by forming a pattern of the support columns and the seal structure body by immersing the exposed wall face material in the development solution.

(4) Coating a seal material, and coating a conventional spherical spacer or forming a columnar spacer, on an as required basis, and forming an oriented film and insulation film on the electrode surface (i.e., the scan electrode surface) on an as required basis.

(5) Adhesively attaching the upper surface substrate, which has a striped electrode pattern (i.e., the signal electrode pattern), and the lower surface substrate, which has a seal structure body and a wall face structure support column, both of which have been produced by the processes of the above paragraphs (1) through (4), so that the electrodes formed on both of the substrates cross at right angles. This is followed by applying the pressurized heating process for an adhesive reaction between the wall face-structured support column and the seal structure body, and joining the lower surface substrate and upper surface substrate in a prescribed distance.

(6) Injecting the liquid crystal into the liquid crystal layer furnished between the lower surface substrate and upper surface substrate from the liquid crystal injection hole provided between the lower surface substrate and upper surface substrate; and, upon finishing the injection of liquid crystal, applying a sealing process for both ends of the liquid crystal layer. It is preferable that the liquid crystal be heated for the liquid injection process since the liquid crystal decreases in viscosity with decrease in temperature. An application of pressure is effective for shortening the time of the liquid crystal injection process.

The above production process eventually completes the LCD element (i.e., the LCD panel).

The LCD elements of the present embodiments described above can be built as a display apparatus of an electronic device in the same manner as a conventional LCD element. The LCD elements of the present embodiments excel in flexibility and crashworthiness and pressure resistance to the display surface, and are capable of maintaining display performance even if the display surface is pressed and/or the display part is bent; they are thus suitable for the display apparatus for an ultra thin electronic device such as electronic paper.

Each of the embodiments described above is a dot matrix LCD element; the present invention, however, can easily be applied to an active matrix LCD element. The form of the pixel is rectangular according to the embodiments described above; the form of a pixel according to the present invention may be different, in lieu of being limited to rectangular. Also, each of the above embodiments is configured to form a wall face structure body on the scan electrode substrate; the wall face structure body, however, may be formed on a signal electrode substrate, followed by adhesively attaching a scan electrode substrate.

Furthermore, the present invention is applicable to an LCD element employing other liquid crystals having the property of display memory, in addition to a cholesteric LCD element.

The present invention is not limited by the embodiments described above.

What is claimed is:

1. A liquid crystal display element of a dot matrix structure comprising:
    a liquid crystal panel constituted by
        a first substrate equipped with a first electrode,
        a second substrate equipped with a second electrode, and
        a liquid crystal layer furnished between the first substrate and the second substrate, wherein
    the liquid crystal layer includes a support column of a wall structure possessing adhesiveness,
    the support column has a shape approximating a shape of a cross,
    a tip part of a branch outward from a center of the cross is a wider tip part that is wider than a middle part of the branch, and
    the wider tip part is more distant than the middle part from the center of the cross in a direction along the branch outward from the center.

2. The liquid crystal display element according to claim 1, wherein all branches of the cross have the wider tip part.

3. A liquid crystal display element of a dot matrix structure comprising:
    a liquid crystal panel constituted by
        a first substrate equipped with a first electrode,
        a second substrate equipped with a second electrode, and
        a liquid crystal layer furnished between the first substrate and the second substrate, wherein
    the liquid crystal layer includes a support column of a wall structure possessing adhesiveness,
    the support column has a shape approximating a shape of a cross,
    a first tip part of a first branch outward from a center of the cross is a first wider tip part that is wider than a first middle part of the first branch,
    the first wider tip part is more distant than the first middle part from the center of the cross in a direction along the first branch outward from the center,
    a second tip part of a second branch outward from a center of the cross is a second wider tip part that is wider than a second middle part of the second branch, and
    the second wider tip part is more distant than the second middle part from the center of the cross in a direction along the second branch outward from the center.

4. The liquid crystal display element according to claim 3, wherein a first center part of the first branch is less distant than the first middle part from the center of the cross in the direction along the first branch and wider than the first middle part, and a second center part of the second branch is less distant than the second middle part from the center of the cross in the direction along the second branch and wider than the second middle part.

* * * * *